United States Patent

Burian et al.

[15] 3,694,582

[45] Sept. 26, 1972

[54] CIRCUIT ARRANGEMENT FOR SUPERVISING THE CODED OUTPUT INFORMATION OF A TRANSLATOR IN TELECOMMUNICATION SYSTEMS AND PARTICULARLY TELEPHONE SYSTEMS

[72] Inventors: Theodor Burian, Ditzingen; Bernhard Krause, Ludwigsburg-Eglosheim, both of Germany

[73] Assignee: International Standard Electric Corporation, New York, N.Y.

[22] Filed: March 10, 1970

[21] Appl. No.: 18,104

[30] Foreign Application Priority Data

March 13, 1969 Germany..........P 19 12 626.2

[52] U.S. Cl..............................................179/18 EB

[51] Int. Cl................................................H04q 3/47

[58] Field of Search.....................179/18 ET, 175.23

[56] References Cited

UNITED STATES PATENTS

| | | |
|---|---|---|
| 3,099,720 | 7/1963 | Gotthardt..........179/18 EB X |
| 3,562,742 | 2/1971 | Abe.......................179/18 EB |

*Primary Examiner*—William C. Cooper

*Attorney*—C. Cornell Remsen, Jr., Walter J. Baum, Percy P. Lantzy, J. Warren Whitesel, Delbert P. Warner and James B. Raden

[57] ABSTRACT

A translator in a telecommunication system is equipped with output checking means. The translator is associated with control wires which are jumpered to determine the value on each output terminal of the translator. A comparison is made to determine when errors are present.

2 Claims, 1 Drawing Figure

PATENTED SEP 26 1972 3,694,582
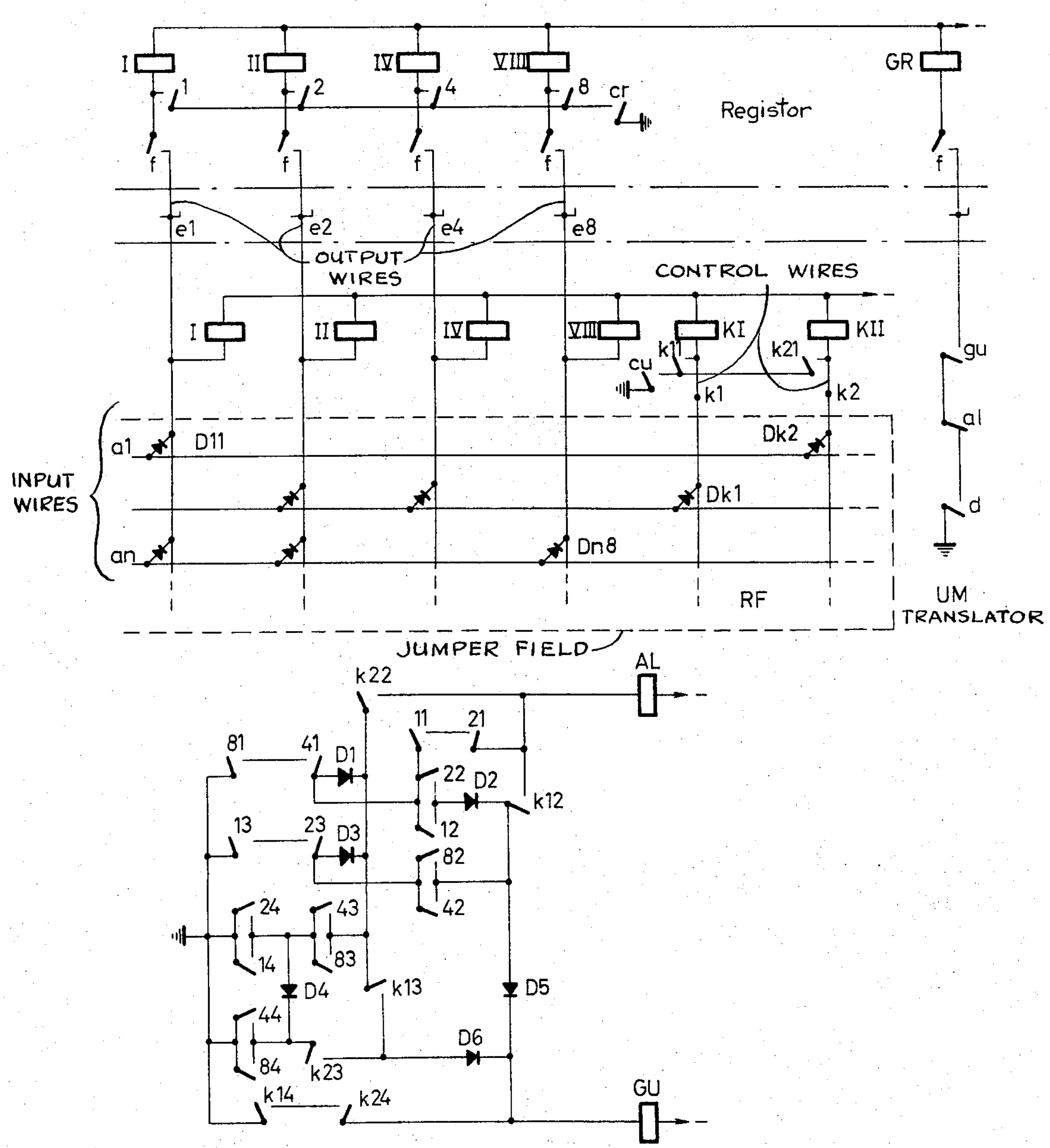
INVENTOR
T. BURIAN - B. KRAUSE
BY D.P. Warner
ATTORNEY

CIRCUIT ARRANGEMENT FOR SUPERVISING THE CODED OUTPUT INFORMATION OF A TRANSLATOR IN TELECOMMUNICATION SYSTEMS AND PARTICULARLY TELEPHONE SYSTEMS

The invention relates to a circuit arrangement for supervising the coded output information of a translator having a connection between the input wires and the output wires in which the output wires are associated with control wires connected with the input wires and the total output information is checked via switching means of the translator connected to the output wires and control wires.

Translators are central control elements which are connected to a requesting register, as required. The information offered by the register via the input wires is converted, via the translator, into another form which then is applied to the register via the output wires.

With multi-digit dial information, therefore, a large number of input and output wires is required, particularly if the individual digits of the input and output information are represented in a checking code. However, such a code involves a relatively complicated control apparatus, so that the binary code is preferably used for the transfer of information between the register and the translator.

The introduction of the binary code, entails the disadvantage that the information transmitted by the translator cannot be checked readily. As shown in the German Pat. No. 1.132.982, a simple supervisory circuit for such coded information of a translator is already known. This supervisory arrangement is based on the consideration that binary coded output information can be checked by a contradictory, binary coded output information. Therefore, the known arrangement provides for a control wire for each output wire. These control wires are also jumpered with the input wires, namely in each case as contradictory information. In each binary digit (output wire and associated control wire), there must be one and only one marking. The supervisory switching means connected to the output and control wires of the translator derive therefrom a "-good" or a "no-good" information. Since the number of the control wires increases with the number of the output wires and as many as three switching means are required for each binary digit, the cost of supervising the coded output information is still relatively high.

It is an object of the invention to considerably further reduce the cost of supervision in a circuit for supervising the coded output information of a translator. According to an aspect of the invention, a circuit arrangement is provided for supervising the coded output information of a translator in telecommunication systems and particularly in telephone systems. In exemplary telephone systems jumpering is provided between the input wires and output wires and the output wires are associated with control wires jumpered to the input wires. The total output information is checked via switching means of the translator connected to the output and control wires. This check is accomplished by combining output wires marking one partial information into one group and, for the purpose of supervision, assigning the value 1 to each output wire of said group. Means associating said group of output wires with additional control wires to which the values $2^0$, $2^1$, $2^2$ etc.

are assigned where a certain value is set for each output information with the aid of said control wires and said output wires and control wires are checked for said value when the translator transmits information. In this case, the number of the control wires is always smaller than that of the output wires. This reduces the number of the supervisory switching means as well as that part of the jumper field which connects these control wires with the input wires. The derivation of the "good" and "no-good" information is simplified, too, because it is only the presence of a certain value on all wires which has to be checked. As a result only one supervisory switching means is required for each wire.

The arrangement according to the invention is such that for a binary code having $n$ digits the control wires and the output wires are, for each information, so jumpered that the value $(n-1)$ is obtained, and the number of the control wires is given by the number of the digits of a binary number which are required for the representation of this value. If only the digits 1 to 0 are to be represented, one group comprises $n=4$ output wires and each information of the translator can be jumpered with two control wires having the values 1 and 2 so that the total value 3 is obtained, because all four output wires are in no case marked simultaneously.

According to a feature of the novel arrangement, the derivation of a "good" and "no-good" information is accomplished in that, when said value is present, a "-good" information is passed to the register via make contacts of the supervisory switching means provided at the output and control wires of the translator, and that, when a smaller or greater value is present, the "-good" information does not appear or is interrupted.

The invention will now be described in detail with reference to the circuit diagram illustrated in the FIGURE. The representation being restricted to the transmission of one digit of dial information.

The register Reg is coupled to the translator UM via the output wires e1, e2, e4 and e8 if, in the requesting register, the through-switching contacts *f* are closed via a switching means not shown. The output wires e1, e2, e4 and e8 run in the register Reg to the receiving relays I, II, IV and VIII, which can close a holding circuit via their own contacts 1,2,4 and 8 if the contact *cr* of the seizing relay of the register is closed too.

The register Reg applies the information to be converted to the input wires *al* to *an*. According to the desired assignment, these input wires are jumpered to the output wires e1, e2, e4 and e8 via diodes such as D11 and Dn8. The jumper field RF has two additional control wires *k*1 and *k*2 which can also be jumpered to the input wires, as the diodes Dk1 and Dk2 show.

It is assumed that a register at the input end of the translator UM marks only one input wire of each group, i.e., the input is effected in the (1 out of *n*)-code where *n* must be 10 if the digits 1 to 9 are to be converted. Then, according to the desired output information, one input wire, e.g., *al*, is coupled with the output wires e1, e2, e4, e8. Via the diode D11, the input wire *al* is jumpered only to the output wire e1. Since, for supervision, all output wires e1 to e8 have the value 1 in the output information, this output information must be brought to the supervision value 3 assigned to all total output information via the diode Dk2 and the control wire $k2$ having the value $2^1 = 2$. Since the input wire an is already coupled with three output wires, namely *e*1, *e*2 and *e*8, the requirement for an additional coupling to the control wires *k*1 and *k*2 is eliminated in this case.

In the translator UM, a supervisory switching means is connected to each output wire and control wire, as the relays I, II, IV, VIII, *k*1 and *k*2 at the wires *e*1, *e*2, *e*4, *e*8, KI and KII show. At the switching means KI and KII it is shown that these supervisory switching means can form their own holding circuit via the contacts *k*11, *k*21 if the seizing contact *cu* of the seizing relay of the translator is closed.

The make contacts of the supervisory switching means control a switching means GU which indicates the presence of the supervision value 3. Thus this relay is energized whenever one output wire and the control wire *k*2 are marked, e.g. 14, D4, k23, D6, whenever two output wires and the control wire k1 are marked, e.g., 24, 43, k13, D6, or whenever three output wires and no control wire are marked, e.g.,13, 23, 82, D5. In each case, the relay GU operates and passes this information to the relay GR of the register Reg via the contact *gu*.

If the value on all wires is smaller, the relay GU does not operate, e.g., 13, 23 or 43, K13, because either a control wire or an output wire has not been marked. If the value exceeds the value 3 predetermined for the supervision, the relay AL will operate in addition to the relay GU, e.g., 41, 81, k22, AL and 44, 84 k23, D6, GU. The contact *al* interrupts the circuit to the relay GR of the register. If the relay GR in the register Reg does not operate, an alarm signal can be released, or other switching operations can be initiated which, within the scope of the present invention, need no description.

We claim:

1. A circuit arrangement for supervising the coded output information of a translator in a telecommunication system, comprising a translator connected between a plurality of input wires for receiving signals arranged in a first code in parallel and a plurality of output wires for transmitting said signals following translation to another code in parallel, means coupling control wires to selected ones of said input wires, checking means including switching means connected to each of the output wires and to each of the control wires, said checking means supervising said output wires and said control wires for signals when the translator transmits information, and said checking means controlling a logic switching circuit to provide signals indicating whether or not a permissible number of output signals are being transmitted to the output wires.

2. A circuit arrangement according to claim 1, in which for a binary code having n-digits the control wires and the output wires are interconnected so that a value having $(n-1)$ digits is obtained, and the number of the control wires is given by the number of the digits of a binary number which are required for the representation of said value $(n-1)$.

* * * * *